US009616527B2

(12) United States Patent
Briand et al.

(10) Patent No.: US 9,616,527 B2
(45) Date of Patent: Apr. 11, 2017

(54) PROCESS FOR LASER-ARC HYBRID WELDING ALUMINIZED METAL WORKPIECES

(75) Inventors: Francis Briand, Paris (FR); Olivier Dubet, Franconville (FR); Corinne Chovet, Conflans Ste Honorine (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1853 days.

(21) Appl. No.: 11/826,111

(22) Filed: Jul. 12, 2007

(65) Prior Publication Data

US 2008/0011720 A1   Jan. 17, 2008

(30) Foreign Application Priority Data

Jul. 12, 2006  (FR) .................... 06 52928

(51) Int. Cl.
*B23K 26/00* (2014.01)
*B23K 26/14* (2014.01)
*B23K 26/26* (2014.01)
*B23K 26/32* (2014.01)
*B23K 26/322* (2014.01)
*B23K 101/34* (2006.01)
*B23K 103/04* (2006.01)
*B23K 103/10* (2006.01)
*B23K 103/00* (2006.01)

(52) U.S. Cl.
CPC ......... *B23K 26/1429* (2013.01); *B23K 26/26* (2013.01); *B23K 26/32* (2013.01); *B23K 26/322* (2013.01); *B23K 2201/34* (2013.01); *B23K 2203/04* (2013.01); *B23K 2203/10* (2013.01); *B23K 2203/50* (2015.10)

(58) Field of Classification Search
CPC ......... B23K 26/00; B23K 26/14; B23K 26/24
USPC .... 219/121.64, 117.1, 118, 76.1, 73, 121.63, 219/121.67, 121.68
See application file for complete search history.

(56) References Cited

U.S. PATENT DOCUMENTS

| 4,854,493 | A | * | 8/1989 | Fujii et al. | ..................... 228/5.7 |
| 5,190,204 | A | * | 3/1993 | Jack et al. | ..................... 228/5.7 |
| 5,389,761 | A | * | 2/1995 | Kresse, Jr. | ................. 219/78.14 |
| 6,963,787 | B2 | * | 11/2005 | Takada et al. | ................ 700/116 |
| 7,906,220 | B2 | | 3/2011 | Hattori et al. | |
| 2001/0026890 | A1 | * | 10/2001 | Ono et al. | ..................... 429/189 |

(Continued)

FOREIGN PATENT DOCUMENTS

| DE | 101 35 611 | 2/2003 |
| EP | 1160047 | 12/2001 |

(Continued)

OTHER PUBLICATIONS

Search Report for FR 0652928, dated Mar. 15, 2007.
Search Report for EP 07301142, dated Oct. 1, 2007.
Search Report for EP 10150100, dated Feb. 8, 2010.

*Primary Examiner* — Dana Ross
*Assistant Examiner* — Ayub Maye
(74) *Attorney, Agent, or Firm* — Elwood L. Haynes; Allen E. White

(57) ABSTRACT

Process for laser welding at least one metal workpiece (1) by a laser beam (3), the workpiece having a surface coating (2) containing aluminum, characterized in that the laser beam (3) is combined with at least one electric arc (4) so as to melt the metal and actually weld the workpiece(s).

17 Claims, 1 Drawing Sheet

(56) References Cited

U.S. PATENT DOCUMENTS

Figure 1:
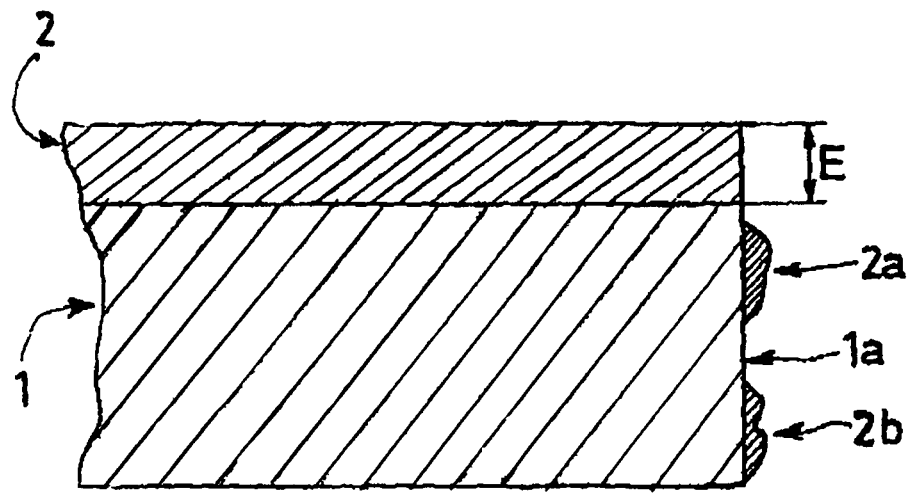

2001/0047984 A1    12/2001  Briand et al.
2005/0011868 A1*  1/2005  Matile et al. ............ 219/121.64
2005/0011870 A1*  1/2005  Bernhardt et al. ....... 219/121.64

FOREIGN PATENT DOCUMENTS

| | | |
|---|---|---|
| EP | 1 669 153 | 6/2006 |
| EP | 166915 | 6/2006 |
| FR | 2655058 | 5/1991 |
| FR | 2829414 | 3/2003 |
| JP | 7132389 | 5/1995 |
| JP | 2000204463 | 7/2000 |
| JP | 2002160082 | 6/2002 |
| JP | 2003 001453 | 1/2003 |

\* cited by examiner

PROCESS FOR LASER-ARC HYBRID WELDING ALUMINIZED METAL WORKPIECES

The present invention relates to a process for laser-arc hybrid welding one or more metal workpieces having an aluminized surface layer or coating, that is to say one that contains aluminium.

Hot-drawable materials, that is to say drawable at about 900° C., such as USIBOR 1500 which is formed from 22 Mn/B5 steel (containing particularly 0.22% C, 1.25% Mn and B), having a very high yield strength (VHYS steel), are generally covered with a layer or coating based on aluminium and silicon, called an "Al—Si layer", for example formed from 90% Al+10% Si (% by weight) in order to prevent oxidation and therefore the appearance of scale during the heat treatment.

This is because, in the absence of this Al—Si layer, if scale were to appear on the surface, the scale layer would have to be removed by sandblasting or by any other equivalent technique, therefore requiring an additional operation that incurs a large extra cost and a loss of productivity from the industrial standpoint.

Furthermore, the Al—Si layer also serves as a surface lubricant when the sheet is being hot-drawn.

The thickness of this layer is generally about 30 µm on USIBOR 1500 for example, and after heat treatment it becomes about 40 to 45 µm, depending on the duration of the treatment, by iron diffusing into the layer and aluminium diffusing into the iron. The upper value of 45 µm is generally a limit value since any higher and the layer becomes too brittle.

This Al—Si layer increases the contact resistance in resistance spot welding, suggesting that it is less conducting than an uncoated steel.

The steel parts produced with this type of coating are mainly structural parts, particularly parts for motor vehicles, such as centre pillars, anti-intrusion reinforcements, bumper cross-members, etc. However, it is also possible to use steel tubes coated with an Al—Si layer to manufacture various structures, such as for example exhaust pipes.

The conventional thicknesses of these coated parts are between 0.8 mm and 2.5 mm.

In general, the use of this type of part with an Al—Si coating is undergoing marked development as this type of coating makes it possible in particular to prevent the above-mentioned scale deposits, though these structural parts are drawable only when hot and their mechanical properties are obtained only after a heat treatment carried out just after forming.

However, these sheets must be cut before being welded, and then drawn. This cutting operation is usually carried out either by shearing or by laser cutting.

The laser-cutting method has the advantage of not taking the coating onto the cut lateral edges. However, this method is expensive in terms of investment cost as it requires the acquisition of a complete laser-cutting installation, thereby stemming its widespread use in industry.

The shearing cutting method is furthermore the least expensive, and therefore the most widespread method in the industry, but it does have the major drawback of transferring a portion of the Al—Si coating onto the edge of the workpiece by a slip effect.

Thus, during a subsequent laser-welding operation in a butted edge configuration (butt welding) of aluminized steel sheets or workpieces cut by shearing, after welding it is noted that there is a phase in the weld bead that is of lower tensile strength than the base metal and the melted zone.

Chemical analysis of the composition of this phase shows that it has a percentage aluminium content (>1.2 wt %) high enough to prevent the austenitic transformation of the steel. This is because, since aluminium is an element that induces the α-phase, above a certain content it prevents the austenitic transformation of steels. Upon cooling, the microstructure of the phase does not change and remains in the δ-ferrite form, having a hardness close to 230 Hv. The matrix itself undergoes an austenitic transformation and then a martensitic/bainitic transformation, resulting in a hardness of about 450 Hv.

Intermetallic compounds exist for aluminium contents of 13% ($Fe_3Al$), of 33% (FeAl), etc. These contents were measured on specimens produced using just a laser.

In other words, a phase is present that has a lower strength than the matrix, and this results in a reduction in the mechanical properties of the assembly.

This phase does not go into solution in the matrix when heated to 900° C. (austenitization) since the austenitic transformation is suppressed and, consequently, during drawing at 900° C. which follows the butt-welding operation, there is a risk of cracking given that this phase has a lower tensile strength than the matrix, which is in the form of austenite at this temperature. Moreover, after carrying out mechanical tests on such a bead, it is found that the overall strength of the weld is lower than that of the base metal. This results in a part that does not meet the specifications.

The problem that arises is therefore how to provide an effective process for welding aluminized workpieces, that is to say workpieces having an Al—Si coating on the surface, making it possible in particular to obtain a welded joint having good properties, including when the workpieces have been cut by shearing and have not undergone a step of preparing the surfaces of their lateral edges.

The solution of the invention is a process for laser welding at least one metal workpiece by a laser beam, said workpiece having a surface coating containing aluminium, characterized in that the laser beam is combined with at least one electric arc so as to melt the metal and weld said workpiece(s).

In other words, during the actual welding, an electric arc combines with the laser beam to melt the metal of the workpiece(s) to be assembled by simultaneously striking a single common welding site or zone.

Depending on the case, the process of the invention may comprise one or more of the following features:
- the coating contains mainly aluminium and silicon;
- the coating has a thickness of between 5 and 45 µm;
- at least one of the workpieces is made of steel;
- at least one of the workpieces has a thickness of between 0.5 and 4 mm, preferably about 0.8 to 2.5 mm;
- at least one of the workpieces has, prior to being welded, deposits of said coating, especially deposits of Al/Si, on the surface of one of its lateral edges;
- the arc is delivered by a tungsten, that is to say a TIG torch, welding electrode, or forms at the end of a consumable wire;
- two workpieces brought into a position with their edges butting each other are welded, or the two edges of one and the same workpiece, which have been brought together, in particular the two longitudinal edges of a tube, are welded;
- during the welding, a gas shield is provided on at least part of the weld bead using a shielding gas chosen from helium/argon mixtures or pure argon; and the laser beam is generated by a laser generator of the $CO_2$, Nd:YAG, diode or ytterbium-doped fibre type.

The invention will be better understood thanks to the following description, given by way of illustration but implying no limitation, with reference to the appended figures.

FIG. 1 shows a diagram, in cross section, of an aluminized steel workpiece 1 that is to say it is covered with an Al—Si coating or layer 2, namely a surface layer based on aluminium and silicon, for example formed from 90% Al+10% Si and intended in particular to prevent oxidation and therefore the appearance of scale after the workpiece has undergone heat treatment. The workpiece has a thickness of for example 1.5 mm and the Al—Si layer has for example a thickness (E) of about 30 μm. This workpiece 1 was cut by shearing, resulting, by a slip effect, in deleterious deposits 2a, 2b of a portion of the Al—Si coating 2 on the edge 1a of the workpiece 1.

Figures 2, 3:
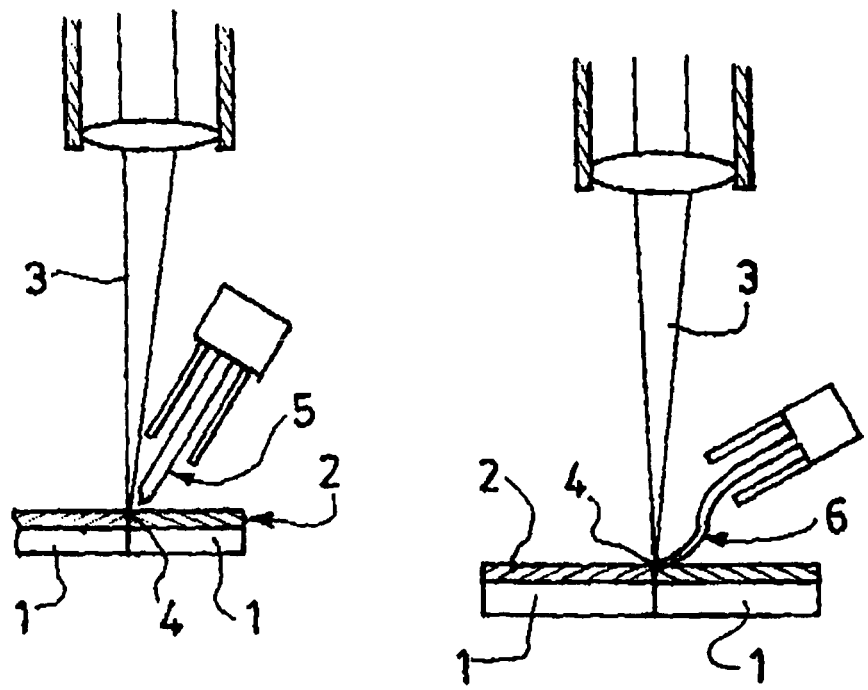

FIGS. 2 and 3 show schematically two methods of implementing laser-arc hybrid processes according to the invention for joining together two aluminized steel workpieces 1 that have been cut by shearing, such as the workpiece shown in FIG. 1.

More precisely, FIG. 2 shows the principle of a laser-TIG hybrid welding process, while FIG. 3 shows the principle of a laser-MIG/MAG hybrid welding process.

If it is desired to increase the degree of dilution of the steel in the weld bead, so as to reduce the aluminium content in the melted zone and thus improve the homogeneity thereof, laser-TIG hybrid welding is used instead (FIG. 2). In this case, the laser beam 3 is combined with an electric arc 4 delivered by a TIG welding torch fitted with a non-consumable tungsten electrode 5.

The use of laser-TIG hybrid welding, in a configuration with the laser beam in front of the arc, that is to say a configuration in which the laser strikes at least one workpiece to be welded immediately in front of the arc, makes it possible to increase the size of the melted zone and consequently allows greater participation of the steel, which has a low content of aluminium (an element inducing the α-phase) and a high content of manganese (an element inducing the γ-phase), which is greater in the melted zone.

Since aluminium is provided only by the Al—Si protective layer, measurements show that the proportion of coating vaporized during the welding operation is much greater than the measured value in the melted zone.

By providing an arc behind the laser and/or providing an additional energy source, for example by defocusing the laser beam or having an oblong focal spot, it is possible to homogenize the melted zone and therefore eliminate the local aluminium concentrations of greater than 1.2%, which create δ-ferrite phases.

In other words, by carrying out a laser-TIG hybrid welding operation it is possible to reduce the proportion of aluminium in the melted zone by increasing the volume of melt metal and homogenizing the melted zone, thus eliminating the local aluminium concentrations of greater than 1.2%.

In contrast, if it is desired instead to provide elements that induce the γ-phase, such as Mn, Ni, Cu, etc., so as to increase the austenitic range allowing phase transformations in the weld, that is to say to counteract the α-phase-inducing effect of aluminium, while still improving the homogeneity of the melted zone, then it is preferred to use laser-MIG hybrid welding (FIG. 3). In this case, the laser beam 3 is combined with an electric arc 4 delivered by an MIG/MAG welding torch fitted with a consumable electrode wire 6, such as a flux-cored wire 6 or a solid wire. The choice of the most suitable wire 6 is made according to the composition of the base metal, the desired properties of the bead, etc.

In fact, laser-MIG hybrid welding, in a configuration with the laser in front of the arc, allows the use of a flux-cored wire or the like containing elements inducing the γ-phase (Mn, Ni, Cu, etc.) favourable to maintaining an austenitic transformation throughout the melted zone.

The additional supply of energy from the electric arc and/or the defocusing of the laser beam homogenizes the melted zone and consequently eliminates the presence of δ-ferrite.

COMPARATIVE EXAMPLE

Two USIBOR 1500 workpieces 1.8 mm in thickness coated with a 30 μm Al/Si layer were welded. One of the workpieces had Al deposits on their edge, characteristic of cutting by shearing.

The shielding gas used was Arcal 37 sold by Air Liquide, namely a 70 vol % helium/30 vol % argon mixture.

These workpieces were welded using:
the arc-laser hybrid process of the invention with a $CO_2$ laser of 6 kW power having a focal length of 250 mm and an arc generated by a TIG/AC torch with a current of 200 A and a voltage of 16 V, an electrode/beam distance of 2 mm and a welding speed of 4 m/min; and
for comparison, a conventional laser-welding process with a power of 6 kW, a focal length of 250 mm and a speed of 4 m/min.

The comparative results obtained are given in the following table.

| Process | $R_{p0.2}$ (N/mm$^2$) | $R_m$ (N/mm$^2$) | A % |
|---|---|---|---|
| Conventional laser | 388 | 502 | 6.1 |
| Laser-TIG hybrid (invention) | 384 | 567 | 25 |

$R_{p0.2}$ is the yield strength of the material, that is to say the limit of its elastic deformation;
$R_m$ is the tensile strength of the material after plastic deformation;
A % is the elongation of the material (a useful value for drawing).

The results obtained show that the tensile values ($R_m$ and A %) are favourable to the laser-TIG hybrid process since, with the process according to the invention, the yield strength of the welded material is substantially identical, while a very appreciable improvement in both the tensile strength after plastic deformation and the elongation of the material is observed.

The invention claimed is:
1. A process for laser welding at least one metal workpiece (1) by a laser beam (3), wherein the metal workpiece comprises a surface coating (2) and a lateral edge surface deposit (2a, 2b) on a lateral edge surface (1a) of the metal workpiece, wherein the surface coating (2) and surface deposit (2a, 2b) each contains mainly aluminum and silicon, and wherein the metal workpiece lateral edge (1a) has been previously formed by a cut by shearing, the process comprising the step of applying the laser beam (3) in combination with at least one electric arc (4) to melt the metal of the workpiece (1) and the lateral edge surface deposit (2a, 2b)

to thereby weld the at least one metal workpiece (1) without formation of local aluminum concentrations in the weld of greater than 1.2%.

2. The process of claim 1, wherein the surface coating (2) has a thickness (E) of between 5 and 45 µm.

3. The process of claim 1, wherein at least one of the workpiece (1) is made of steel.

4. The process of claim 1, wherein at least one of the workpieces (1) has a thickness of between 0.5 and 4 mm.

5. The process of claim 1, wherein the arc (4) is delivered by a tungsten welding electrode (5) or forms at the end of a consumable wire (6).

6. The process of claim 1, wherein two workpieces (1) brought into a position with their edges butting each other are welded, or the two edges of one and the same workpiece, which have been brought together, in particular the two longitudinal edges of a tube, are welded.

7. The process of claim 1, wherein during the welding, a gas shield is provided on at least part of the weld bead using a shielding gas chosen from helium/argon mixtures or pure argon.

8. The process of claim 1, wherein the laser beam (3) is generated by a laser generator of the $CO_2$, Nd:YAG, diode or ytterbium-doped fibre type.

9. The process of claim 1, wherein at least one of the workpiece (1) has a thickness of between 0.8 and 2.5 mm.

10. The process of claim 2 wherein at least one of the workpieces (1) is made of steel.

11. The process of claim 3, wherein at least one of the workpieces (1) has a thickness of between 0.5 and 4 mm.

12. The process of claim 11, wherein at least one of the workpiece (1) has a thickness of between 0.8 and 2.5 mm.

13. The process of claim 10, wherein at least one of the workpieces (1) has a thickness of between 0.5 and 4 mm.

14. The process of claim 13, wherein the arc (4) is delivered by a tungsten welding electrode (5) or forms at the end of a consumable wire (6).

15. The process of claim 14, wherein two workpieces (1) brought into a position with their edges butting each other are welded, or the two edges of one and the same workpiece, which have been brought together, in particular the two longitudinal edges of a tube, are welded.

16. The process of claim 15, wherein during the welding, a gas shield is provided on at least part of the weld bead using a shielding gas chosen from helium/argon mixtures or pure argon.

17. The process of claim 16, wherein the laser beam (3) is generated by a laser generator of the $CO_2$, Nd:YAG, diode or ytterbium-doped fibre type.

* * * * *